(12) United States Patent
Chen et al.

(10) Patent No.: US 8,918,241 B2
(45) Date of Patent: Dec. 23, 2014

(54) AUTONOMOUS MOBILE DEVICE AND OPERATING METHOD FOR THE SAME

(71) Applicant: Agait Technology Corporation, New Taipei City (TW)

(72) Inventors: Tien-Chen Chen, New Taipei (TW); Kai-Sheng Lee, New Taipei (TW)

(73) Assignee: Agait Technology Corporation, New Taipei (TW)

( * ) Notice: Subject to any disclaimer, the term of this patent is extended or adjusted under 35 U.S.C. 154(b) by 0 days.

(21) Appl. No.: 13/945,386

(22) Filed: Jul. 18, 2013

(65) Prior Publication Data

US 2014/0121876 A1 May 1, 2014

(30) Foreign Application Priority Data

Oct. 30, 2012 (TW) .............................. 101220975 A

(51) Int. Cl.
*G05D 1/02* (2006.01)

(52) U.S. Cl.
CPC ............ *G05D 1/0219* (2013.01); *G05D 1/0272* (2013.01); *G05D 1/0225* (2013.01); *G05D 1/0274* (2013.01); *Y10S 901/16* (2013.01)
USPC ................... 701/22; 701/26; 701/25; 701/23; 701/24; 700/245; 700/253; 318/568.12; 901/16

(58) Field of Classification Search
CPC .................................................... G05D 1/0272
USPC .......................................... 701/26, 24, 25, 23
See application file for complete search history.

(56) References Cited

U.S. PATENT DOCUMENTS

| | | | | |
|---|---|---|---|---|
| 4,674,048 A | * | 6/1987 | Okumura | 701/25 |
| 4,700,427 A | * | 10/1987 | Knepper | 15/319 |
| 5,220,263 A | * | 6/1993 | Onishi et al. | 318/587 |
| 5,284,522 A | * | 2/1994 | Kobayashi et al. | 134/18 |
| 5,321,614 A | * | 6/1994 | Ashworth | 701/26 |
| 5,440,216 A | * | 8/1995 | Kim | 318/587 |
| 5,537,017 A | * | 7/1996 | Feiten et al. | 318/587 |
| 5,634,237 A | * | 6/1997 | Paranjpe | 15/319 |
| 5,646,845 A | * | 7/1997 | Gudat et al. | 701/41 |
| 5,677,836 A | * | 10/1997 | Bauer | 701/23 |
| 5,758,298 A | * | 5/1998 | Guldner | 701/23 |
| 5,841,259 A | * | 11/1998 | Kim et al. | 318/587 |
| 5,867,800 A | * | 2/1999 | Leif | 701/23 |
| 5,956,250 A | * | 9/1999 | Gudat et al. | 701/26 |
| 5,974,347 A | * | 10/1999 | Nelson | 701/22 |
| 5,995,884 A | * | 11/1999 | Allen et al. | 701/24 |
| 6,119,057 A | * | 9/2000 | Kawagoe | 701/23 |
| 6,167,332 A | * | 12/2000 | Kurtzberg et al. | 701/23 |
| 6,370,453 B2 | * | 4/2002 | Sommer | 701/23 |
| 6,374,155 B1 | * | 4/2002 | Wallach et al. | 700/245 |

(Continued)

*Primary Examiner* — John R Olszewski
*Assistant Examiner* — Mohsen Ghajargar
(74) *Attorney, Agent, or Firm* — SmithAmundsen LLC; Dennis S. Schell; Kelly J. Smith

(57) ABSTRACT

An autonomous mobile device is configured to move on a surface provided with a base station thereon, and is operated in one of a work state and return state. In the work state, the autonomous mobile device is operable to plot a movement route along which the autonomous mobile device moves, and is operable to adjust the movement route upon presence of an obstacle. In the return state, the autonomous mobile device is operable to plot a returning route on the surface from the current position to the base station, and to move along the returning route to the base station.

14 Claims, 12 Drawing Sheets

(56) References Cited

U.S. PATENT DOCUMENTS

| | | | | |
|---|---|---|---|---|
| 6,496,755 | B2* | 12/2002 | Wallach et al. | 700/245 |
| 6,580,246 | B2* | 6/2003 | Jacobs | 318/568.16 |
| 6,590,222 | B1* | 7/2003 | Bisset et al. | 250/559.29 |
| 6,809,490 | B2* | 10/2004 | Jones et al. | 318/568.12 |
| 6,841,963 | B2* | 1/2005 | Song et al. | 318/568.12 |
| 7,173,391 | B2* | 2/2007 | Jones et al. | 318/568.12 |
| 7,206,677 | B2* | 4/2007 | Hulden | 701/23 |
| 7,251,548 | B2* | 7/2007 | Herz et al. | 701/23 |
| 7,343,230 | B2* | 3/2008 | McMurtry et al. | 701/23 |
| 7,606,659 | B2* | 10/2009 | Erignac | 701/455 |
| 7,660,650 | B2* | 2/2010 | Kawagoe et al. | 701/23 |
| 7,739,047 | B2* | 6/2010 | Meunier et al. | 701/300 |
| 7,805,220 | B2* | 9/2010 | Taylor et al. | 700/245 |
| 7,844,398 | B2* | 11/2010 | Sato et al. | 701/301 |
| 8,060,254 | B2* | 11/2011 | Myeong et al. | 700/253 |
| 8,145,415 | B2* | 3/2012 | Levy | 701/120 |
| 8,224,516 | B2* | 7/2012 | Anderson | 701/23 |
| 8,234,068 | B1* | 7/2012 | Young et al. | 701/528 |
| 8,239,992 | B2* | 8/2012 | Schnittman et al. | 15/41.1 |
| 8,260,485 | B1* | 9/2012 | Meuth et al. | 701/26 |
| 8,347,444 | B2* | 1/2013 | Schnittman et al. | 15/41.1 |
| 8,442,714 | B2* | 5/2013 | Matsukawa et al. | 701/26 |
| 8,515,578 | B2* | 8/2013 | Chiappetta et al. | 700/253 |
| 8,515,612 | B2* | 8/2013 | Tanaka et al. | 701/25 |
| 8,515,613 | B2* | 8/2013 | Tanaka et al. | 701/25 |
| 8,612,084 | B2* | 12/2013 | Hennessy et al. | 701/25 |
| 8,620,510 | B1* | 12/2013 | Meuth et al. | 701/26 |
| 2002/0095239 | A1* | 7/2002 | Wallach et al. | 700/245 |
| 2003/0055532 | A1* | 3/2003 | Sakagami et al. | 700/245 |
| 2003/0055542 | A1* | 3/2003 | Knockeart et al. | 701/26 |
| 2003/0069824 | A1* | 4/2003 | Menninger | 705/37 |
| 2003/0212472 | A1* | 11/2003 | McKee | 700/245 |
| 2004/0030570 | A1* | 2/2004 | Solomon | 705/1 |
| 2004/0030571 | A1* | 2/2004 | Solomon | 705/1 |
| 2004/0068416 | A1* | 4/2004 | Solomon | 705/1 |
| 2004/0111184 | A1* | 6/2004 | Chiappetta et al. | 700/245 |
| 2004/0134337 | A1* | 7/2004 | Solomon | 89/1.11 |
| 2004/0204792 | A1* | 10/2004 | Taylor et al. | 700/245 |
| 2004/0211444 | A1* | 10/2004 | Taylor et al. | 134/18 |
| 2004/0236468 | A1* | 11/2004 | Taylor et al. | 700/245 |
| 2004/0244138 | A1* | 12/2004 | Taylor et al. | 15/319 |
| 2005/0000543 | A1* | 1/2005 | Taylor et al. | 134/18 |
| 2005/0010331 | A1* | 1/2005 | Taylor et al. | 700/245 |
| 2005/0038562 | A1* | 2/2005 | Bash et al. | 700/245 |
| 2005/0046373 | A1* | 3/2005 | Aldred | 318/580 |
| 2005/0102098 | A1* | 5/2005 | Montealegre et al. | 701/209 |
| 2006/0106496 | A1* | 5/2006 | Okamoto | 700/253 |
| 2007/0042716 | A1* | 2/2007 | Goodall et al. | 455/67.11 |
| 2008/0058987 | A1* | 3/2008 | Ozick et al. | 700/250 |
| 2009/0012667 | A1* | 1/2009 | Matsumoto et al. | 701/26 |
| 2009/0076674 | A1* | 3/2009 | Kiegerl et al. | 701/26 |
| 2010/0036556 | A1* | 2/2010 | Na et al. | 701/26 |
| 2010/0063628 | A1* | 3/2010 | Landry et al. | 700/258 |
| 2010/0228394 | A1* | 9/2010 | Yi et al. | 700/253 |
| 2010/0299016 | A1* | 11/2010 | Benzler et al. | 701/26 |
| 2011/0010033 | A1* | 1/2011 | Asahara et al. | 701/26 |
| 2011/0167574 | A1* | 7/2011 | Stout et al. | 15/3 |
| 2011/0202175 | A1* | 8/2011 | Romanov et al. | 700/250 |
| 2011/0295423 | A1* | 12/2011 | Anderson | 700/248 |
| 2011/0320085 | A1* | 12/2011 | Gharsalli et al. | 701/26 |
| 2012/0011669 | A1* | 1/2012 | Schnittman et al. | 15/52.1 |
| 2012/0029697 | A1* | 2/2012 | Ota et al. | 700/253 |
| 2012/0197464 | A1* | 8/2012 | Wang et al. | 701/2 |
| 2012/0221187 | A1* | 8/2012 | Jeon | 701/26 |
| 2012/0253582 | A1* | 10/2012 | Chrysanthakopoulos et al. | 701/26 |
| 2012/0259481 | A1* | 10/2012 | Kim | 701/2 |
| 2012/0296511 | A1* | 11/2012 | More et al. | 701/26 |
| 2013/0124031 | A1* | 5/2013 | Chen et al. | 701/23 |
| 2013/0166134 | A1* | 6/2013 | Shitamoto et al. | 701/26 |
| 2013/0238182 | A1* | 9/2013 | Osagawa et al. | 701/26 |
| 2013/0238183 | A1* | 9/2013 | Goulding | 701/26 |
| 2013/0311031 | A1* | 11/2013 | Friend et al. | 701/26 |
| 2013/0325244 | A1* | 12/2013 | Wang et al. | 701/26 |

\* cited by examiner

AUTONOMOUS MOBILE DEVICE AND OPERATING METHOD FOR THE SAME

CROSS-REFERENCE TO RELATED APPLICATION

This application claims priority of Taiwanese Application No. 101220975, filed on Oct. 30, 2012.

BACKGROUND OF THE INVENTION

1. Field of the Invention

The invention relates to an autonomous mobile device, more particularly to an autonomous mobile device whose movement can be properly plotted.

2. Description of the Related Art

Generally, operation of a wireless autonomous mobile device (such as an automatic lawnmower, an automatic floor scrubber, etc.) on a surface is powered by a battery attached to the autonomous mobile device. When the battery becomes low on power, the autonomous mobile device must be returned to a base station, which may be connected to a household power outlet, so as to recharge the battery.

Conventionally, a number of ways can be employed to direct the autonomous mobile device back to the base station. For example, the autonomous mobile device may be configured to randomly travel on the surface and actively search for a beacon signal sent from the base station. When the beacon signal is detected, the autonomous mobile device may subsequently move toward the base station accordingly.

In the cases where the base station is placed by a wall surface, the autonomous mobile device may also be configured to search for the wall surface using a collision detector, and to move along the wall surface until the base station is reached.

The autonomous mobile device may also be configured to continuously capture images of the surface along a traveled path, and when it is to return, the autonomous mobile device is configured to reverse and move along the traveled path backward backwardly, in order to return to the base station.

It can be seen that however, each of the abovementioned ways for returning the autonomous mobile device to the base station does not necessarily enable the autonomous mobile device to return through the shortest, or a relatively efficient path. Since the battery may be already low when the autonomous mobile device is returning, returning through an ineffective path may add to the risk that the battery of the autonomous mobile device is depleted during the return trip, resulting in the autonomous mobile device being unable to return to the base station.

SUMMARY OF THE INVENTION

Therefore, the object of the present invention is to provide an autonomous mobile device that is configured to plot a returning route that is relatively efficient, therefore reducing the risk of not able to return for recharging.

Accordingly, an autonomous mobile device of the present invention is configured to move on a surface provided with a base station thereon. The autonomous mobile device comprises a housing, a motion control module disposed at the housing for controlling movement of the autonomous mobile device, a detecting module disposed at the housing for detecting presence of an obstacle near the housing, and a processor. The processor is coupled to the motion control module and the detecting module, and is configured to operate the autonomous mobile device in one of a work state and return state.

In the work state, the processor is operable to plot a movement route on the surface and to control the motion control module to move the autonomous mobile device along the movement route on the surface, and is operable to adjust the movement route upon presence of an obstacle detected by the detecting module.

In the return state, the processor is operable to:
partition a portion of the surface, over which the autonomous mobile device moves in the work state, into a plurality of virtual blocks;
determine a starting one of the virtual blocks where the autonomous mobile device currently locates, a destination one of the virtual blocks where the base station locates, and an exclusion one of the virtual blocks where the obstacle locates;
using the virtual blocks except the exclusion one, plot a returning route on the surface from the starting one to the destination one of the virtual blocks; and
control the motion control module to move the autonomous mobile device along the returning route to the base station.

Another object of the present invention is to provide an operating method for the abovementioned autonomous mobile device.

Accordingly, an operating method of the present invention is for operating an autonomous mobile device configured to move on a surface provided with a base station thereon. The autonomous mobile device includes a motion control module for controlling movement of the autonomous mobile device, a detecting module for detecting presence of an obstacle, and a processor coupled to the motion control module and the detecting module. The operating method comprises the following steps of:
operating, by the processor, the autonomous mobile device in a work state with the following sub-steps of
plotting a movement route on the surface,
controlling the motion control module to move the autonomous mobile device along the movement route on the surface, and
adjusting the movement route upon presence of an obstacle detected by the detecting module; and
operating, by the processor, the autonomous mobile device in a return state with the following sub-steps of
partitioning a portion of the surface, over which the autonomous mobile device moves in the work state, into a plurality of virtual blocks,
determining a starting one of the virtual blocks where the autonomous mobile device currently locates, a destination one of the virtual blocks where the base station locates, and an exclusion one of the virtual blocks where the obstacle locates,
using the virtual blocks except the exclusion one to plot a returning route on the surface from the starting one to the destination one of the virtual blocks, and
controlling the motion control module to move the autonomous mobile device along the returning route to the base station.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
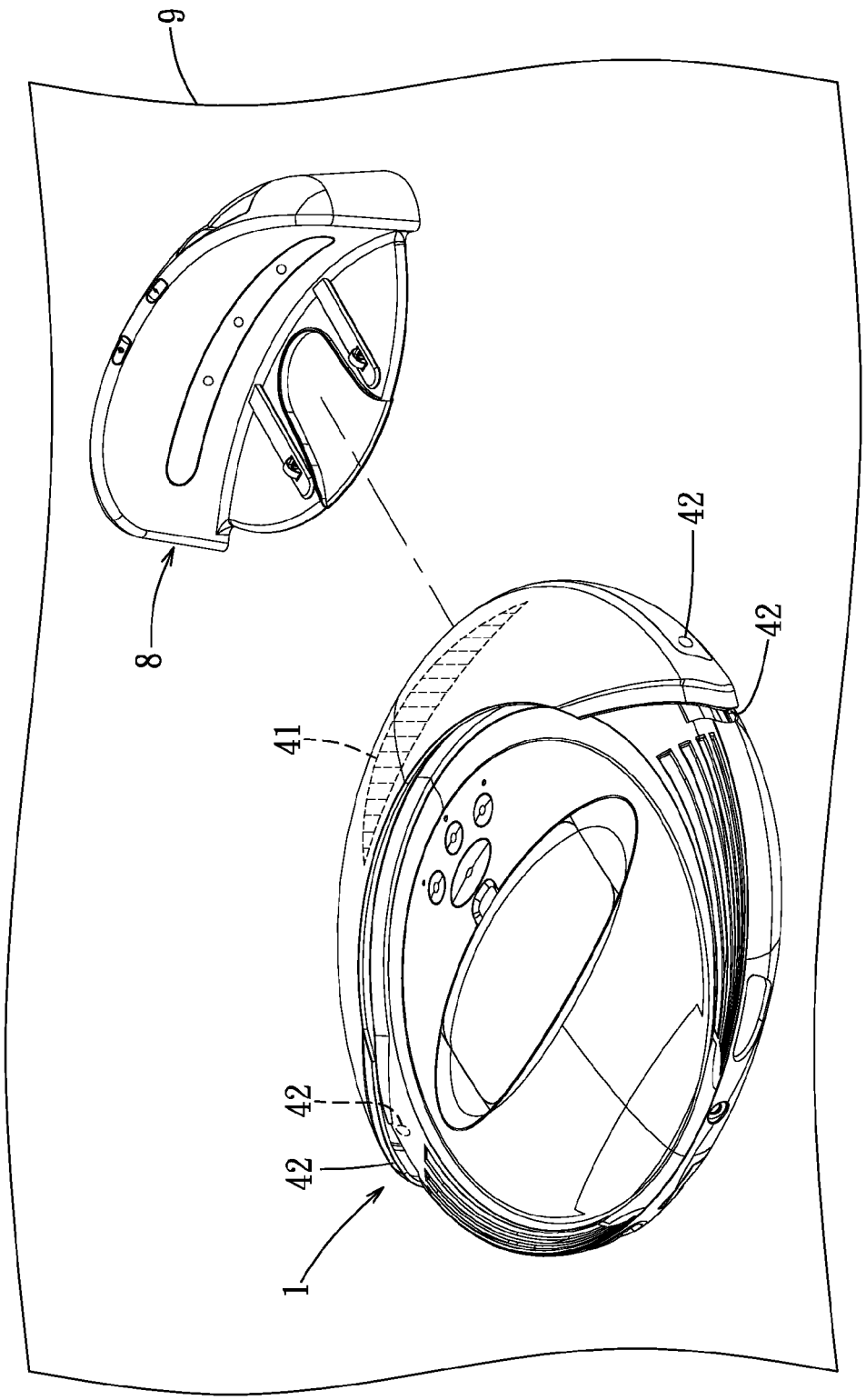
FIG. 1 is a schematic view of a preferred embodiment of an autonomous mobile device and a base station, according to the invention.

FIG. 1 is an illustration of the preferred embodiment of an autonomous mobile device 1 according to the present invention. The autonomous mobile device 1 is a floor scrubber in this embodiment, is generally configured to move on a surface 9, and can be detachably connected to a base station 8 that is disposed on the surface 9, and that is connected to a power source, such as a household power outlet. The base station 8, when connected to the autonomous mobile device 1, is able to provide power to the autonomous mobile device 1.

It is noted that, the surface 9 is a floor surface of a room in this embodiment, but in other embodiments the autonomous mobile device 1 may be operational on various form of surfaces.

Figure 2:
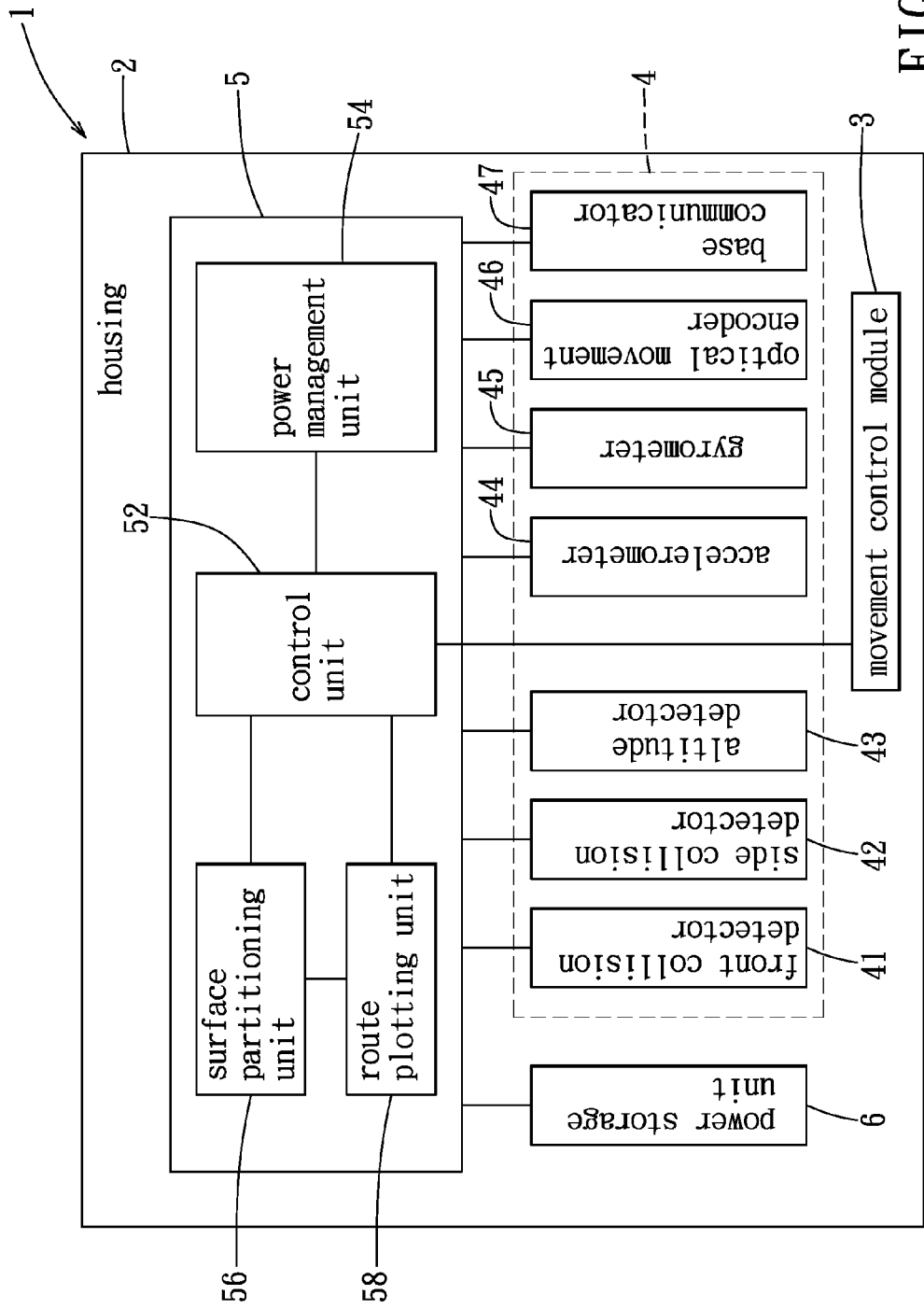
FIG. 2 is a schematic functional block diagram illustrating components of the autonomous mobile device.

FIG. 2 is a functional block diagram illustrating components of the autonomous mobile device 1, which comprises a housing 2. A number of components are disposed at the housing 2, including a motion control module 3, a detecting module 4, a processor 5 and a power storage unit 6.

The housing 2 may be shaped as shown in FIG. 1. The motion control module 3 is for controlling movement of the autonomous mobile device 1. In this embodiment, the movement of the autonomous mobile device 1 may include linear movement and rotation. It is noted that movements of the components that are disposed at the housing 2 are driven by the movement of the autonomous mobile device 1.

The detecting module 4 is for detecting presence of an obstacle near the housing 2. Specifically, the detecting module 4 includes a front collision detector 41, a pair of side collision detectors 42, an altitude detector 43, an accelerometer 44, a gyrometer 45, an optical movement encoder 46, and a base communicator 47.

The front collision detector 41 is disposed on a front position of the housing 2, and always faces forward when the autonomous mobile device 1 moves straight. Each of the side collision detectors 42 is disposed on a respective side of the housing 2 with respect to the front position (see FIG. 1). Therefore, the front collision detector 41 and the side collision detectors 42 are capable of detecting objects that come near the autonomous mobile device 1.

The altitude detector 43 is disposed on a bottom side of the housing 2, and is capable of detecting a vertical distance between the bottom side of the housing 2 and the surface 9. The accelerometer 44 and the gyrometer 45 is configured to record the acceleration and angular velocity of the autonomous mobile device 1, to detect an angle, at which the autonomous mobile device 1 rotates when the autonomous mobile device 1 rotates, and to output the angle thus detected to the processor 5. The optical movement encoder 46 is capable of continuously detecting a current position of the autonomous mobile device 1 on the surface, and outputting to the processor 5 the current position thus detected. The base communicator 47 is configured to receive a beacon signal from the base station 8 wirelessly.

The processor 5 is coupled to the motion control module 3 and the detecting module 4, and is configured to operate the autonomous mobile device 1 in one of a work state and return state. Specifically, the processor 5 includes a controlling unit 52, a power management unit 54, a surface partitioning unit 56, and a route plotting unit 58.

Figure 6:
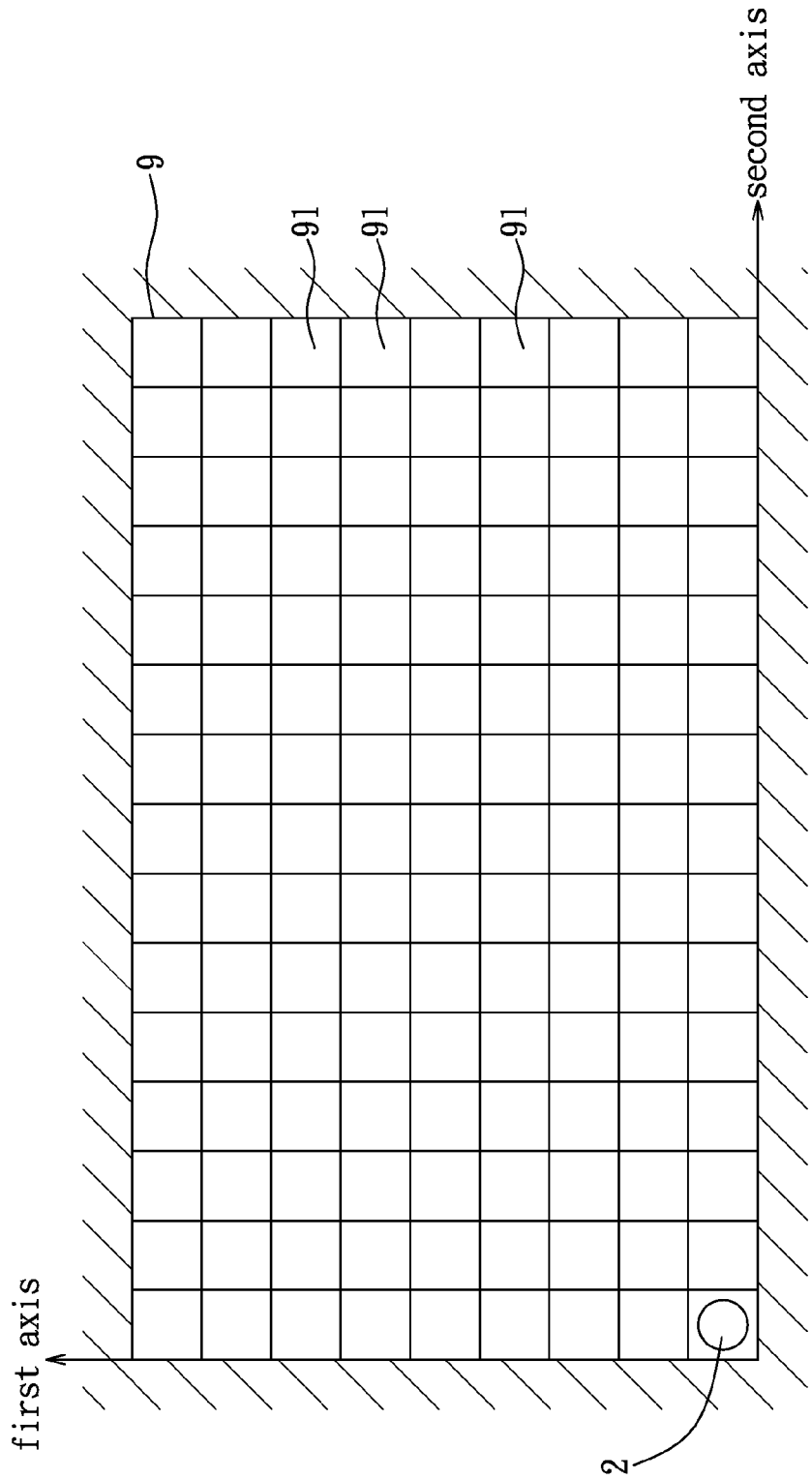
FIG. 6 illustrates the surface being partitioned into a plurality of virtual blocks.

The controlling unit 52 is configured to control operation of the motion control module 3. The power management unit 54 is configured to monitor the amount of electrical power stored in the power storage unit 6. The surface partitioning unit 56 is configured to partition a portion of the surface 9, over which the autonomous mobile device 1 moves in the work state, into a plurality of virtual blocks 91 with respect to a first axis and a second axis perpendicular to the first axis (one such partition may be done as shown in FIG. 6).

Furthermore, based on information obtained by the detecting module 4, the surface partitioning unit 56 may also determine a starting one of the virtual blocks 91 where the autonomous mobile device 1 currently locates, a destination one of the virtual blocks 91 where the base station 8 locates, and an exclusion one of the virtual blocks 91 that is deemed inaccessible (e.g., being occupied with an obstacle).

Specifically, the term 'obstacle' in this disclosure is used to describe one of the following:

(1) an impassable object detected by the front collision detector 41 and/or the side collision detectors 42;

(2) a part of the surface 9, where a vertical distance between the bottom side of the housing 2 and the part of the surface 9 is greater than a predetermined safe height; and (3) a part of the surface 9 having an inclination steeper than a predetermined safe inclination.

The route plotting unit 58 is configured to plot a movement route in the work state, and to plot a returning route on the surface 9 from the starting one to the destination one of the virtual blocks 91 in the return state, using the virtual blocks 91 except the exclusion one. Upon presence of the obstacle detected by the detecting module 4, the route plotting unit 58 is also configured to adjust the movement route and/or the returning route.

The basic operation of the autonomous mobile device 1 on the surface 9 will now be described with reference to FIG. 3. In this embodiment, the surface 9 has a rectangular shape, and can be of arbitrary shapes in other embodiments.

First, the autonomous mobile device 1 is electrically connected to the base station 8 (which is located at location (I), with the front collision detector 41 facing toward location (II)) for charging the power storage unit 6. When an external signal (for example, from a remote controller operated by a user) instructing the autonomous mobile device 1 to start operation is received, the power management unit 54 determines whether the power storage unit 6 is sufficiently charged for operation (for example, 75% charged or fully charged). The autonomous mobile device 1 may be prevented from moving away from the base station 8 when the power storage unit 6 is yet sufficiently charged.

When the autonomous mobile device 1 is allowed to start moving (i.e., to enter the work state), the control unit 52 first attempts to determine a virtual boundary that defines that surface 9, on which the autonomous mobile device 1 is able to move. Specifically, the autonomous mobile device 1 is configured to move straight until the front collision sensor 41 first detects a surrounding wall, which surrounds the surface 9, at an initial position (for example, position (I) of FIG. 3). Subsequently, the control unit 52 operates the autonomous mobile device in the work state with a contouring mode, in which the control unit 52 controls the movement control module 3 to move the autonomous mobile device 1 around the surrounding wall until the autonomous mobile device 1 is returned to the initial position. For example, as indicated by the solid line in FIG. 3, the autonomous mobile device 1 first moves from position (I) along the first axis toward position (II). The autonomous mobile device 1 then stops when the front collision sensor 41 detects a part of the surrounding wall. At this position, since that only one of the side collision detectors 42 (the left one) is aware of the existence of the surrounding wall, the route plotting unit 58 decides to rotate the autonomous mobile device 1 clockwise by a predetermined angle (90 degrees in this embodiment). The autonomous mobile device 1 is then controlled to move along the second axis toward position (III). Applying the same logic above, the autonomous mobile device 1 will be similarly rotated, and controlled to move toward position (IV), before returning to the initial position.

In order to maintain awareness of the position on the surface 9 at all times, the detecting module 4 is configured for continuously detecting a current position of the autonomous mobile device 1 on the surface 9. The detecting module 4 is further configured for detecting an angle, at which the autonomous mobile device 1 rotates, and for outputting the current position and the angle thus detected to the control unit 52.

Additionally, in the contouring mode, the control unit 52 executes a number of operations in order to determine the virtual boundary within which the autonomous mobile device 1 is able to move. For example, the control unit 52 is operable to record, respectively as a rotating position and a rotation angle, the current position and the angle received from the detecting module 4 whenever the autonomous mobile device 1 rotates by an angle greater than a predetermined value (e.g., 45 degrees). The control unit 52 is further operable to record, as an interval position, the current position of the autonomous mobile device 1 received from the detecting module 4 every time after the autonomous mobile device 1 moves a predetermined distance (e.g., a distance approximately equal to a diameter of the housing 2). Afterward, the control unit 52 derives a fitting equation expressing the interval positions between successive two of the rotating positions based on the interval positions. As a result, the virtual boundary detected by the control unit 52 using the derived fitting equation can be seen as shown by the solid line in FIG. 4.

After the autonomous mobile device 1 returns to the initial position in the contouring mode, the control unit 52 is operable to switch from the contouring mode to a ransacking mode.

Figure 3:
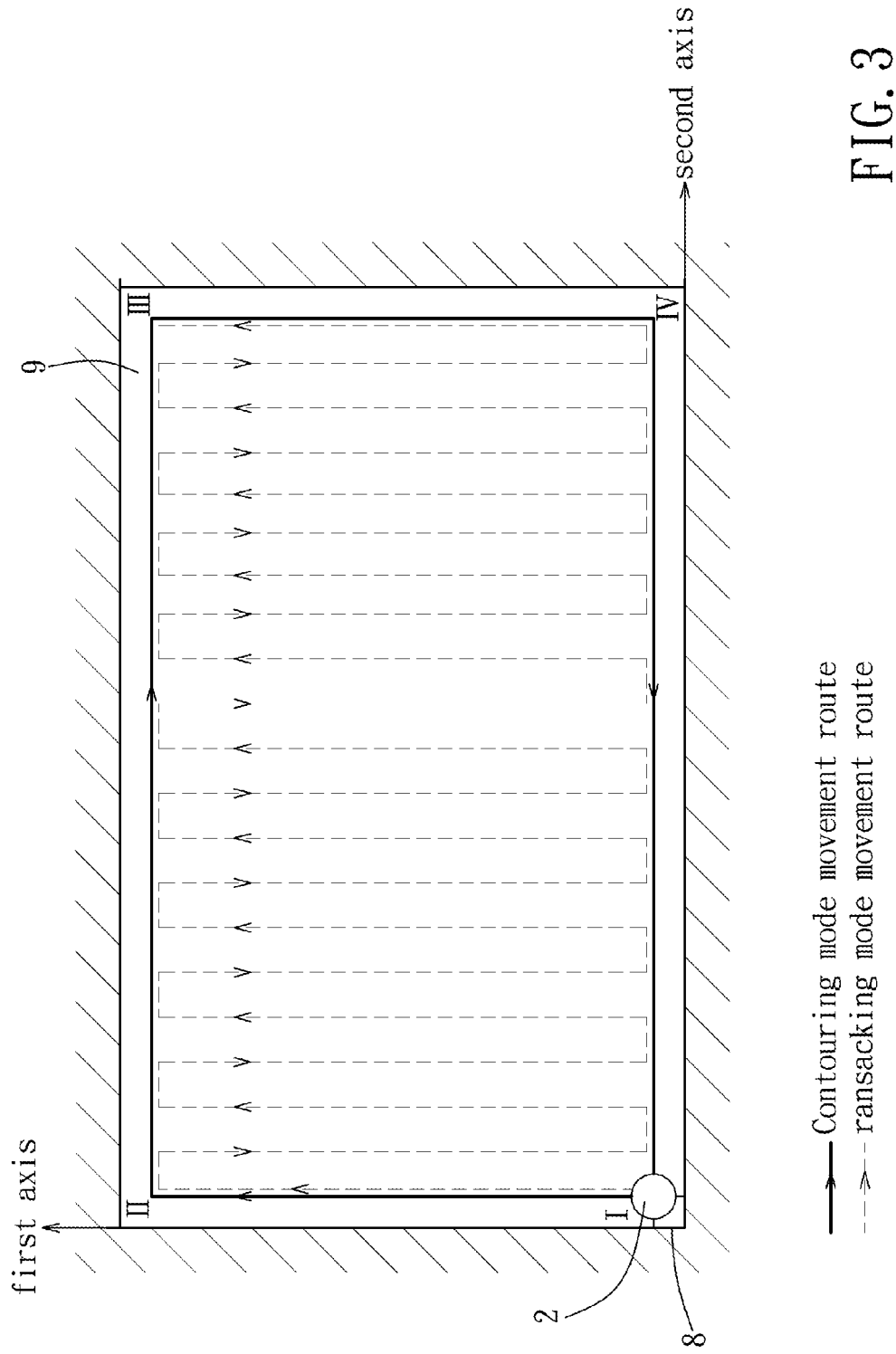
FIG. 3 illustrates exemplary movement routes of the autonomous mobile device on a surface in a contouring mode and a ransacking mode, respectively.
Figure 4:
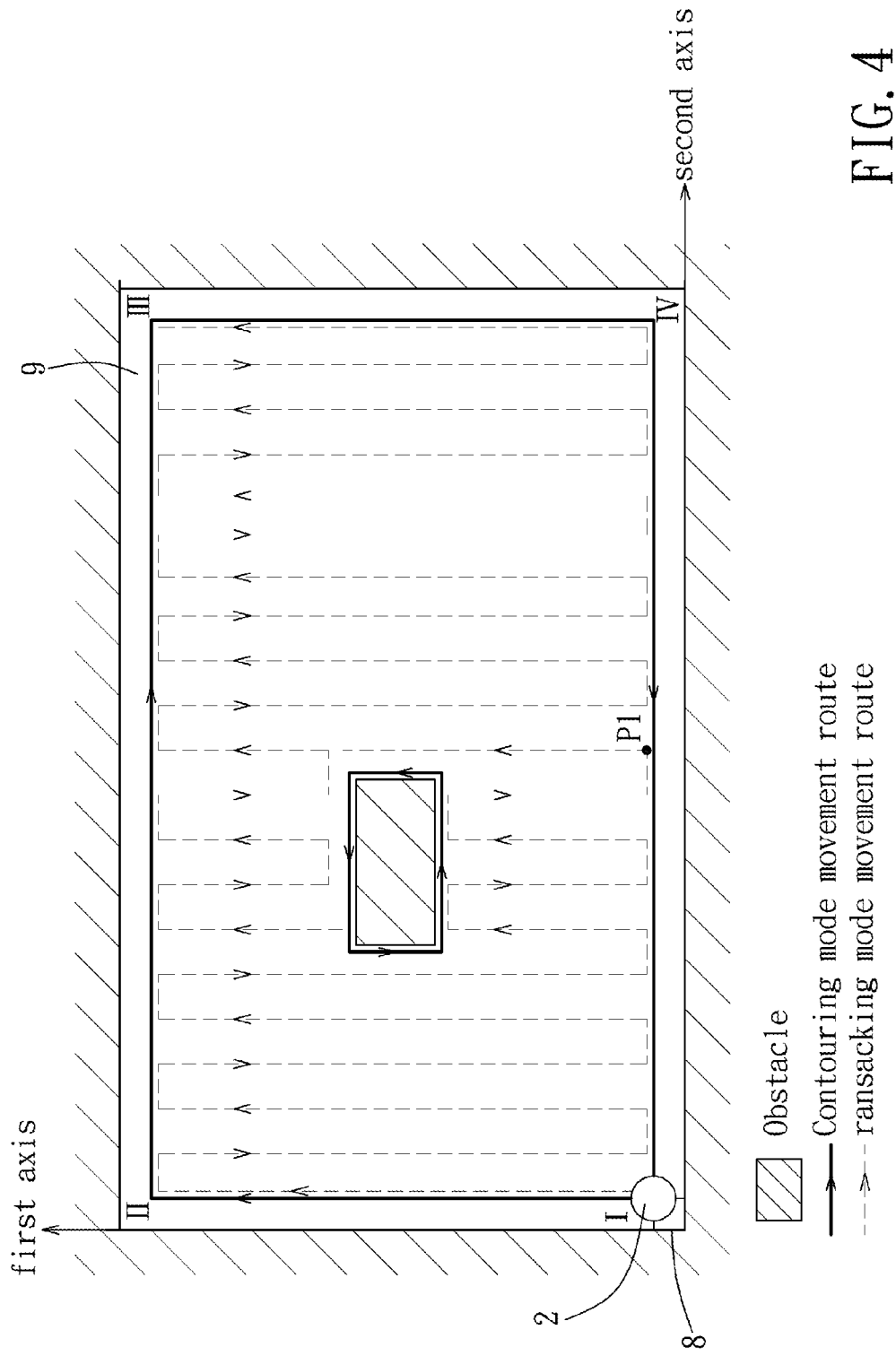
FIG. 4 illustrates a set of exemplary movement routes in the ransacking mode upon presence of an obstacle.
Figure 5:
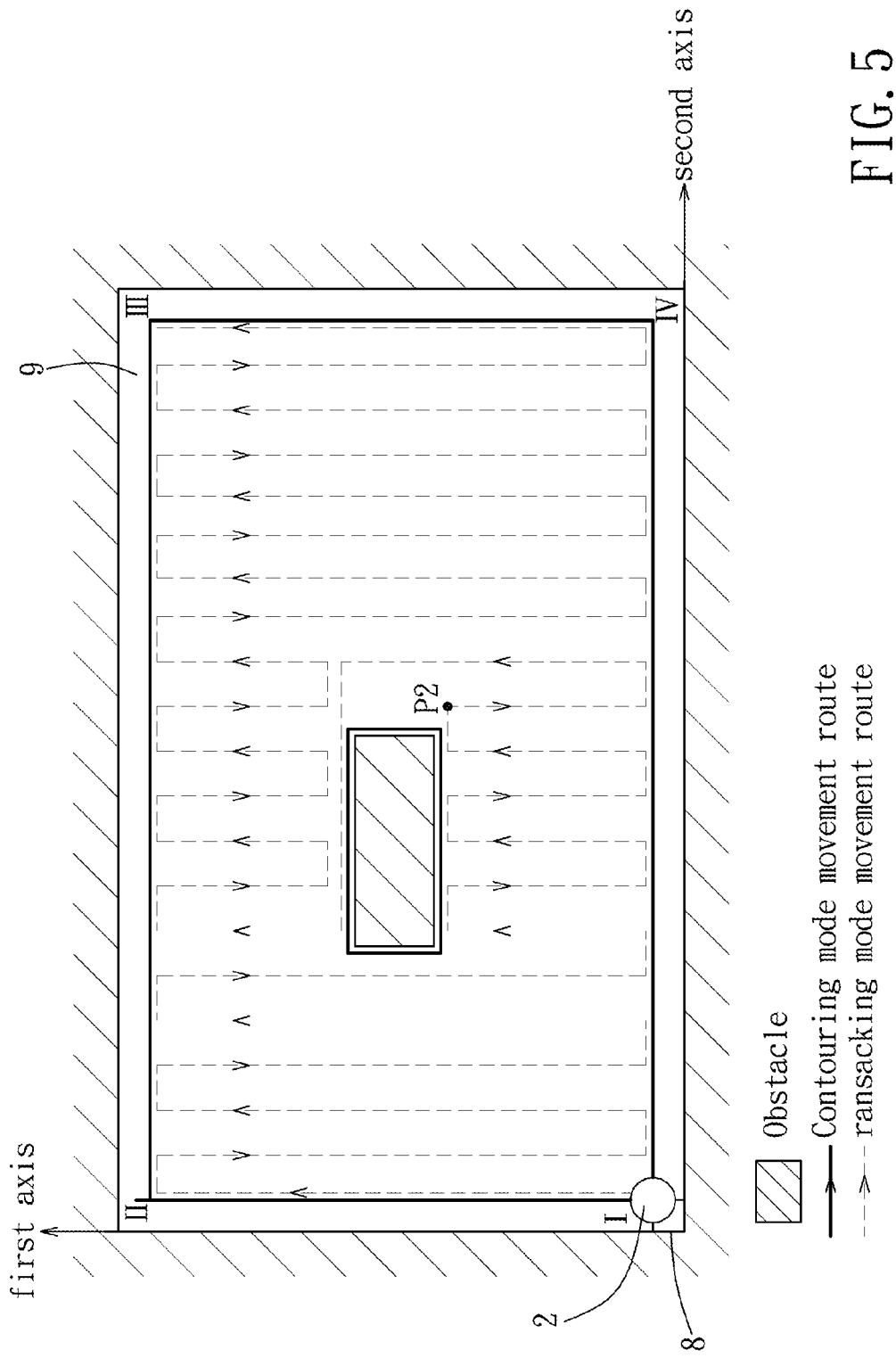
FIG. 5 illustrates another set of exemplary movement routes similar to those depicted in FIG. 4.

The movement of the autonomous mobile device 1 in the ransacking mode can be illustrated by the dashed lines in FIGS. 3,4 and 5. That is, the control unit 52 first controls the movement control module 3 to move the autonomous mobile device 1 in a forward direction (along the first axis).

When the front collision detector 41 detects an obstacle during operation in the ransacking mode, the control unit 52 first determines whether a present position of the autonomous mobile device 1 can be expressed by the previously derived fitting equation. When it is determined that the present position can be expressed by the fitting equation (e.g., the autonomous mobile device 1 is currently on a part of the virtual boundary), the control unit 52 controls the movement control module 3 to rotate the autonomous mobile device 1 to face a transverse direction (along the second axis), and to move the autonomous mobile device 1 in the transverse direction by a transverse distance. Afterward, the control unit 52 controls the movement control module 3 to rotate the autonomous mobile device 1 to face an inverse direction opposite to the forward direction, and to move the autonomous mobile device 1 in the inverse direction. In the ransacking mode, the same procedure will be applied whenever a part of the virtual boundary is reached.

On the other hand, when it is determined by the control unit 52 that the present position of the autonomous mobile device 1 cannot be expressed by the fitting equation (see FIG. 4), the control unit 52 operates the autonomous mobile device 1 back in the contouring mode and controls the movement control module to move the autonomous mobile device 1 around the obstacle until the autonomous mobile device 1 returns to the present position. A set of fitting equations that corresponds to the obstacle is similarly derived for future reference. Therefore, as shown in FIG. 4, the next time the autonomous mobile device 1 encounters the obstacle, the control unit 52 will remain in the ransacking mode and control the movement control module 3 accordingly. FIGS. 4 and 5 illustrate two exemplary movements that can be employed in presence of the obstacle.

The control unit 52 operates the autonomous mobile device 1 in the return state when a recall situation occurs. For example, the recall situation may include one of the following:

(1) the autonomous mobile device 1 has traveled thoroughly over the surface;

(2) the power management unit 54 detects that an amount of electrical power stored in the power storage unit 6 is less than a threshold (e.g., 25% charged); and (3) the autonomous mobile device 1 receives an external return signal.

Figure 7:
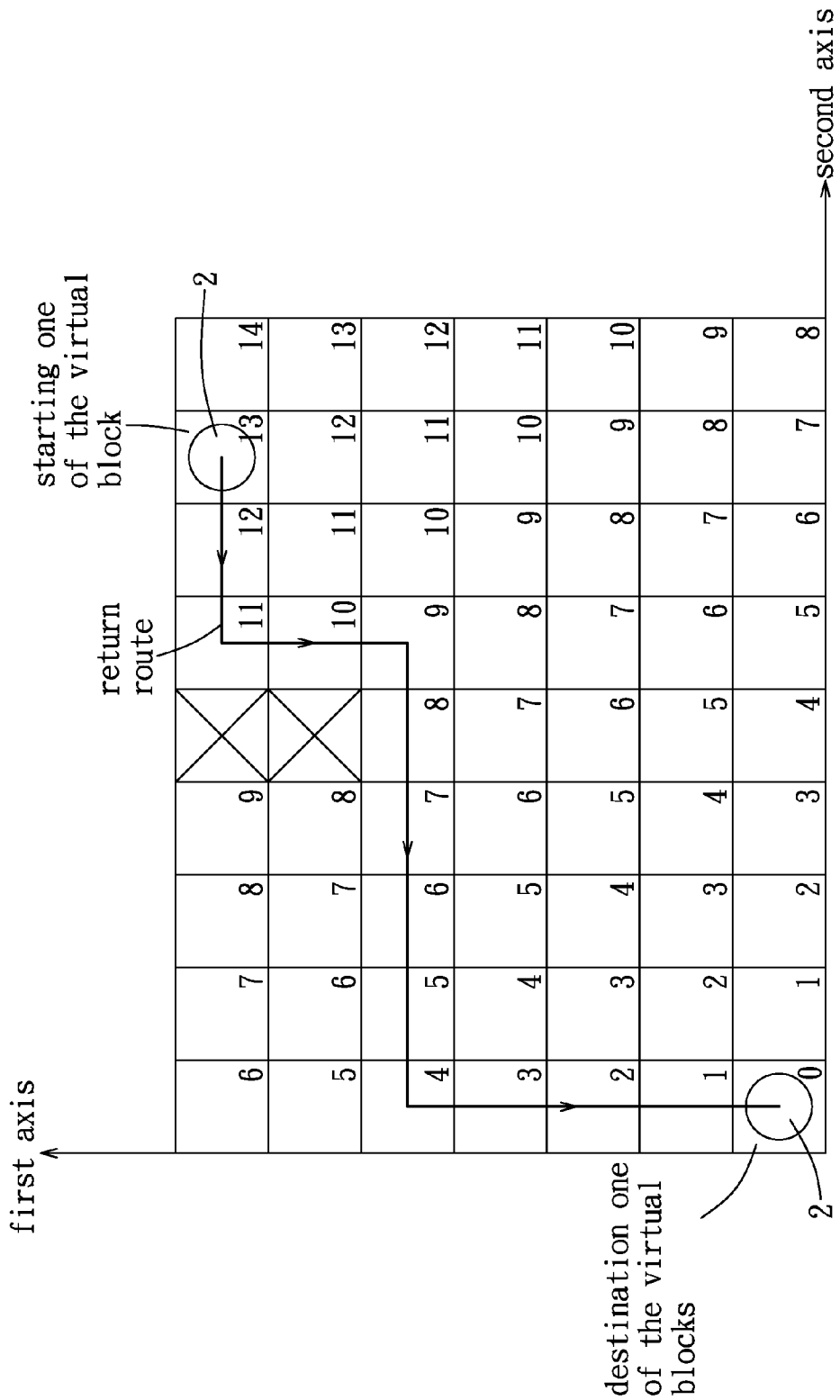
FIG. 7 illustrates a number being assigned to each of the virtual blocks, and a returning route being plotted based on the assigned numbers.

On occurrence of any one of the above recall situations, a returning route on the surface 9 must be plotted for the autonomous mobile device 1. In order to do so, the surface partitioning unit 56 is first operable to assign a number to each of the virtual blocks 91 of the surface 9. Particularly, a value of the number assigned to one of the virtual blocks 91 is monotonically related to a block distance between the one of the virtual blocks 91 and the destination one of the virtual blocks 91. Preferably, the values of the numbers assigned to the virtual blocks 91 are gradually increased as the block distances increase. Additionally, the virtual blocks 91 that are occupied with an obstacle (the exclusion ones) will be assigned with an "x" indicating they are impassable. An exemplary number assignment may be as shown in FIG. 7, where the virtual block 91 on which the base station 8 locates is assigned a 0, and the adjacent ones are assigned a 1, etc.

Figure 8:
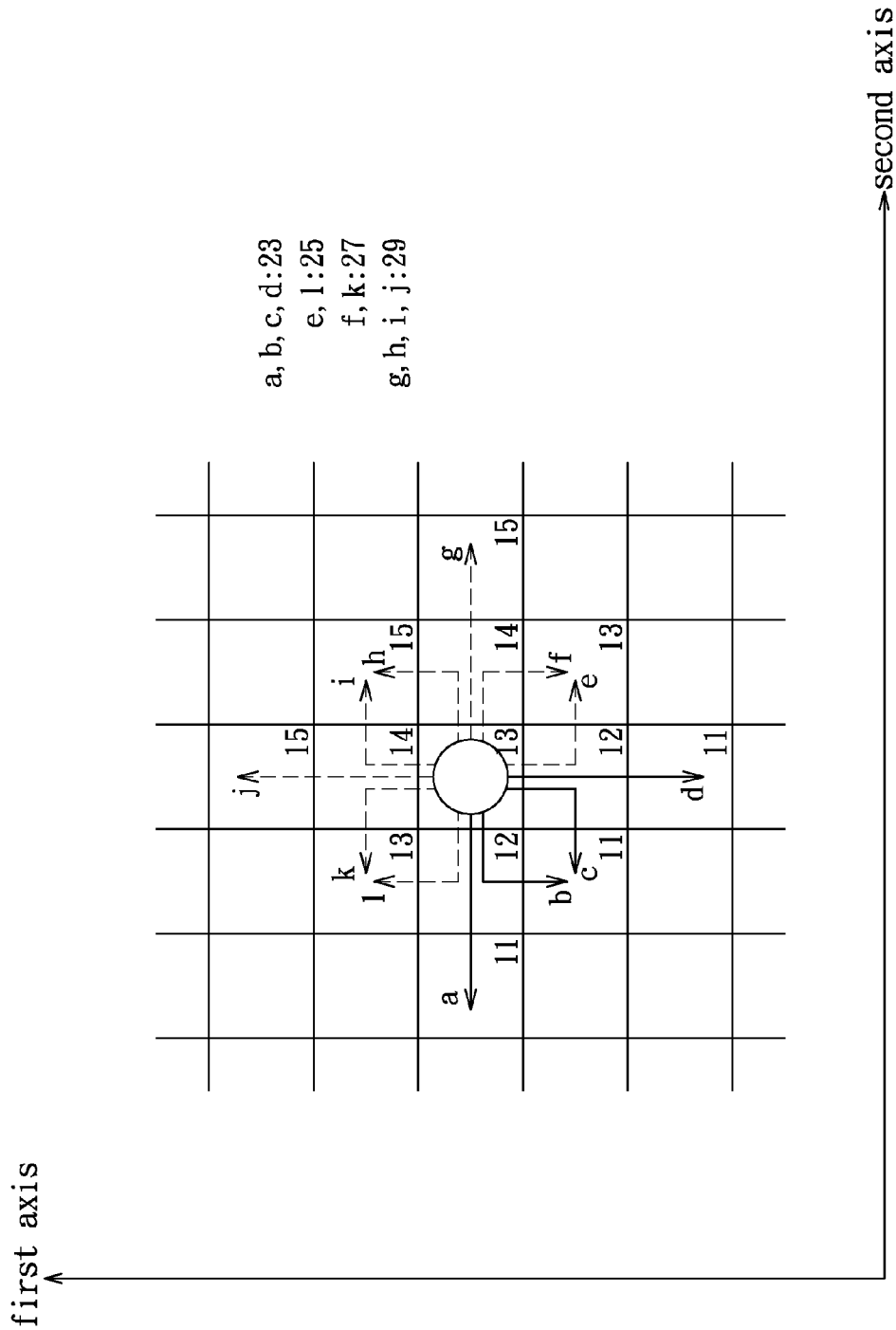
FIG. 8 illustrates a number of possible ways that can be selected as a part of the returning route being identified.

The route plotting unit 58 is then operable to plot the returning route using the information from the surface partitioning unit 56. Specifically, the route plotting unit 58 identifies all possible ways that do not include an exclusion one of the virtual blocks 91 to move the autonomous mobile device 1 across successive two of the virtual blocks 91. See FIG. 8, where a total of 12 possible ways are illustrated (as (a) to (l)).

Then the route plotting unit 58 calculates, for each of the possible ways, a sum of the values of the numbers that are assigned to the successive two of the virtual blocks 91, and selecting one of the possible ways that has a smallest sum as a part of the returning route. Using the numbers in FIG. 8, it can be seen that four of the possible ways (i.e., (a) to (d)) share a common smallest sum of 23. To deal with such situation, for example, the route plotting unit 58 may select one of these possible ways, which is along the second axis toward the base station 8, as the part of the returning route. In this case, the possible way (a) is selected, but other possible ways may be selected as long as the sum thereof is the smallest. Then, the control unit 52 controls the movement control module 3 to move the autonomous mobile device 1, along the selected one of the possible ways, to a first one of the successive two of the virtual blocks 91. In this case, the autonomous mobile device 1 moves to a left adjacent one of the virtual blocks 91 having an assigned number of 12. Afterwards, the same procedure is repeated until the autonomous mobile device 1 returns to the base station 8.

In some embodiments, when it is determined that the autonomous mobile device 1 is sufficiently close to the base station 8 (e.g., the base communicator 47 is able to receive a beacon signal from the base station 8), the route plotting unit 58 may plot the autonomous mobile device 1 directly toward the base station 8, therefore further shortening a length of the returning route.

In the returning mode, when the autonomous mobile device 1 encounters an unexpected obstacle within the returning route, the control unit 52 may halt the movement of the autonomous mobile device 1 for a waiting period (e.g., 5 seconds), and determine whether the unexpected obstacle remains. When that is the case, the control unit 52 may control the movement control module 3 to move the autonomous mobile device 1 around the unexpected obstacle in attempt to find a clear path such that the autonomous mobile device 1 may be back on track. In some embodiments, the control unit 52 may detour to another one of the possible ways calculated by the route plotting unit 58. On the other hand, if the unexpected obstacle disappears within the waiting period, the control unit 52 controls the movement control module 3 to resume moving the autonomous mobile device 1 along the originally plotted returning route.

It is understood that the abovementioned algorithm for controlling the autonomous mobile device 1 in this embodiment can be readily adjusted in order to work properly on different surfaces having various shapes and/or virtual boundaries.

Figure 9:
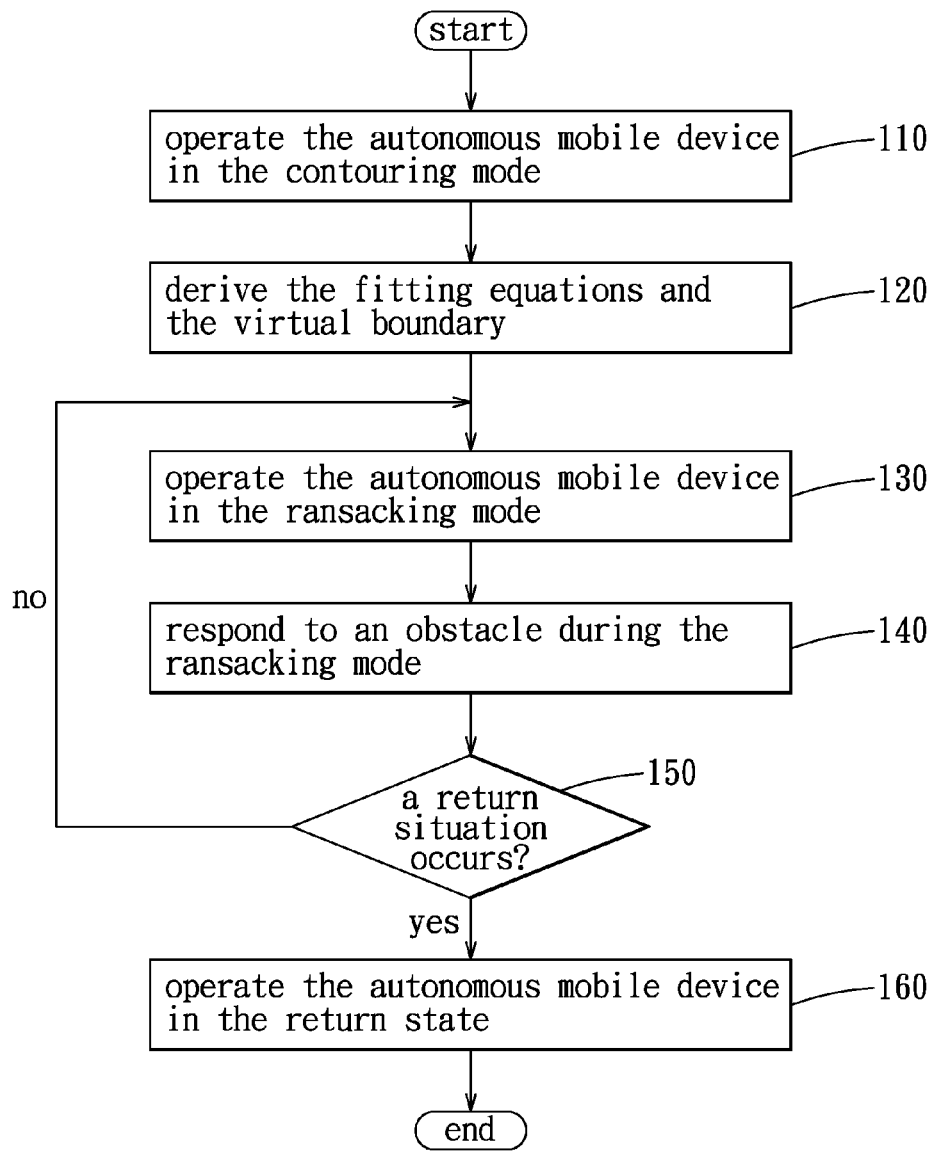
FIG. 9 is a flow chart of an operating method for the autonomous mobile device.

Referring to FIG. 9, the above described operation may be summarized by steps of an operating method for controlling the autonomous mobile device 1.

In step 100, the autonomous mobile device 1 is electrically connected to the base station 8 for charging the power storage unit 6, such that when the power storage unit 6 is sufficiently charged, the control unit 52 allows the autonomous mobile device 1 to start operating in response to the external signal.

In step 110, the control unit 52 operates the autonomous mobile device 1 in the contouring mode, in order to determine the virtual boundary of the surface 9. Once the autonomous mobile device 1 returns to the initial position, the flow proceeds to step 120, in which the fitting equations expressing the interval positions between successive two of the rotating positions are derived, and the virtual boundary is determined.

Afterward, in step 130, the control unit 52 operates the autonomous mobile device 1 in the ransacking mode. The autonomous mobile device 1 is configured to move thoroughly over the surface 9.

Figure 10:
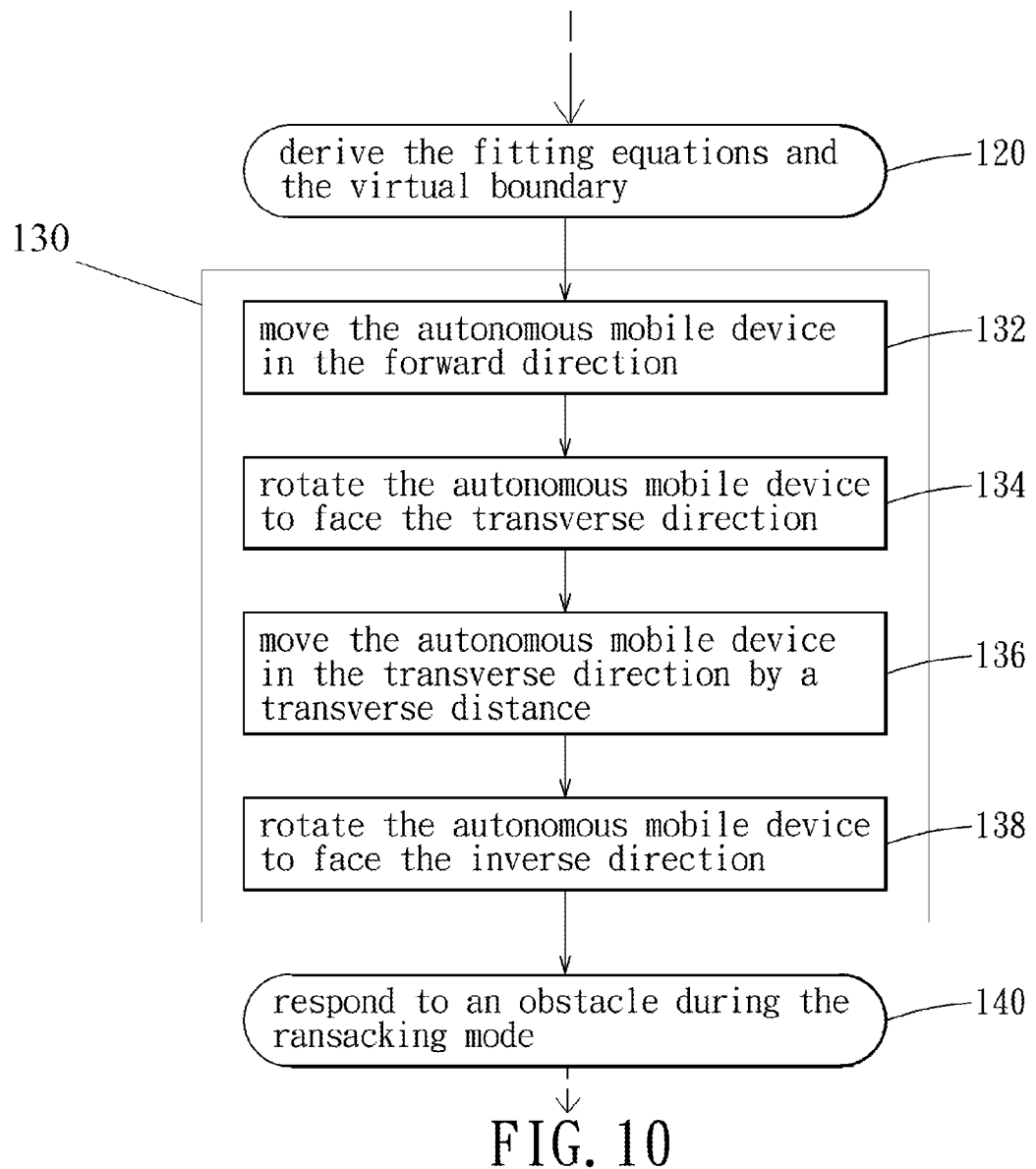
FIG. 10 is a flow chart illustrating operation of the autonomous mobile device in a ransacking mode.

FIG. 10 illustrates the detailed movement of the autonomous mobile device 1 in the ransacking mode. That is, the control unit 52 first controls the movement control module 3 to move the autonomous mobile device 1 in the forward direction in sub-step 132. Upon reaching the virtual boundary, the control unit 52 controls the movement control module 3 to rotate the autonomous mobile device 1 to face a transverse direction in sub-step 134, to move the autonomous mobile device 1 in the transverse direction by a transverse distance in sub-step 136, and to rotate the autonomous mobile device 1 to face an inverse direction opposite to the forward direction for subsequently moving the autonomous mobile device 1 in the inverse direction in sub-step 138.

Figure 11:
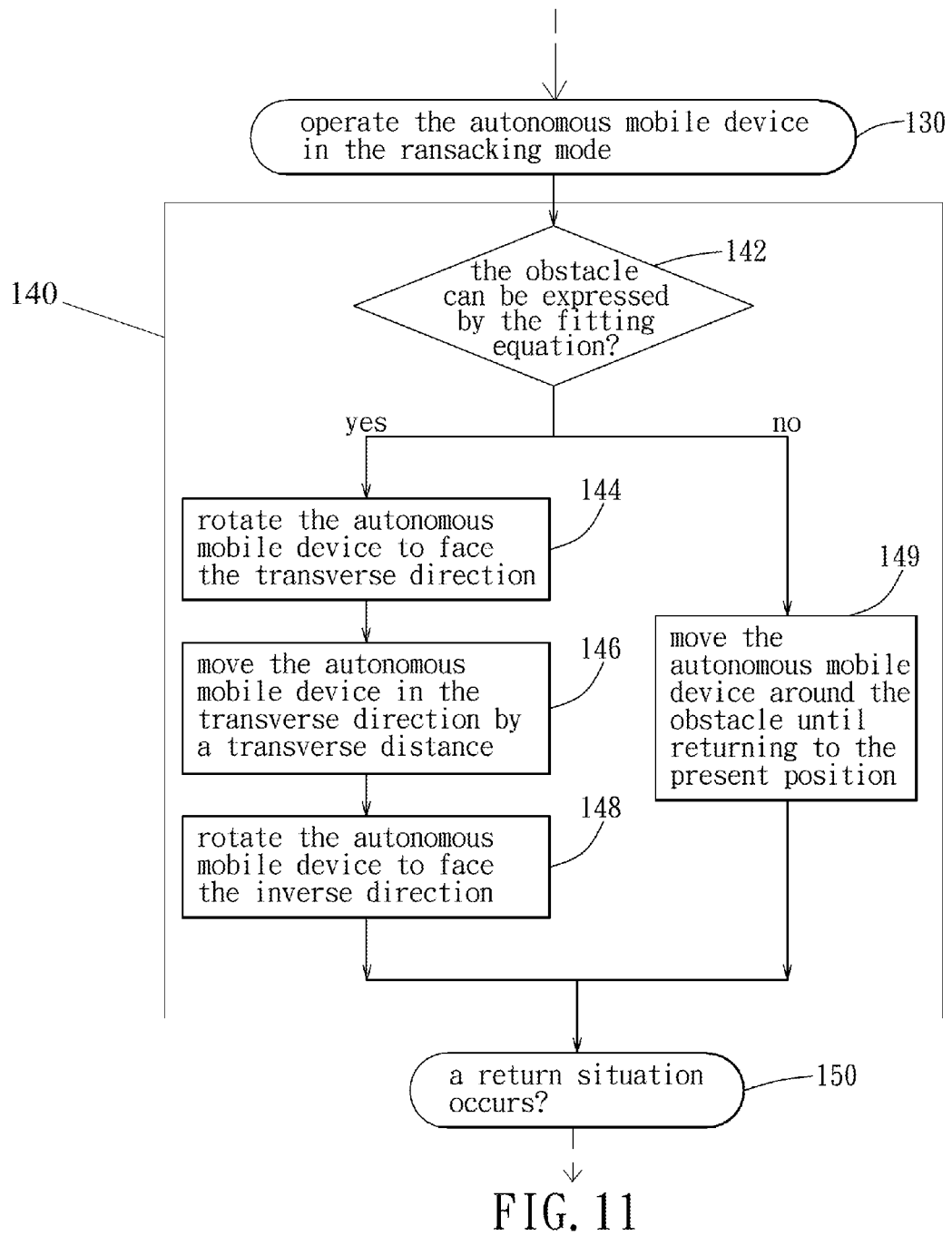
FIG. 11 a flowchart illustrating operation of the autonomous mobile device upon presence of the obstacle.

Referring to FIG. 11, when an obstacle is encountered during the ran sacking mode, the control unit 52 responds, in step 140, by first determining whether the obstacle can be expressed by the previously derived fitting equation in sub-step 142. When an affirmative determination is reached, the control unit 52 executes sub-steps 144 to 146, which are similar to sub-steps 134, 136 and 138, respectively. Otherwise, in sub-step 149, the control unit 52 controls the movement control module 3 to move the autonomous mobile device 1 around the obstacle until the autonomous mobile device 1 returns to the present position.

When a recall situation occurs in step 150, the control unit 52 in response operates the autonomous mobile device 1 in the return state in step 160.

Figure 12:
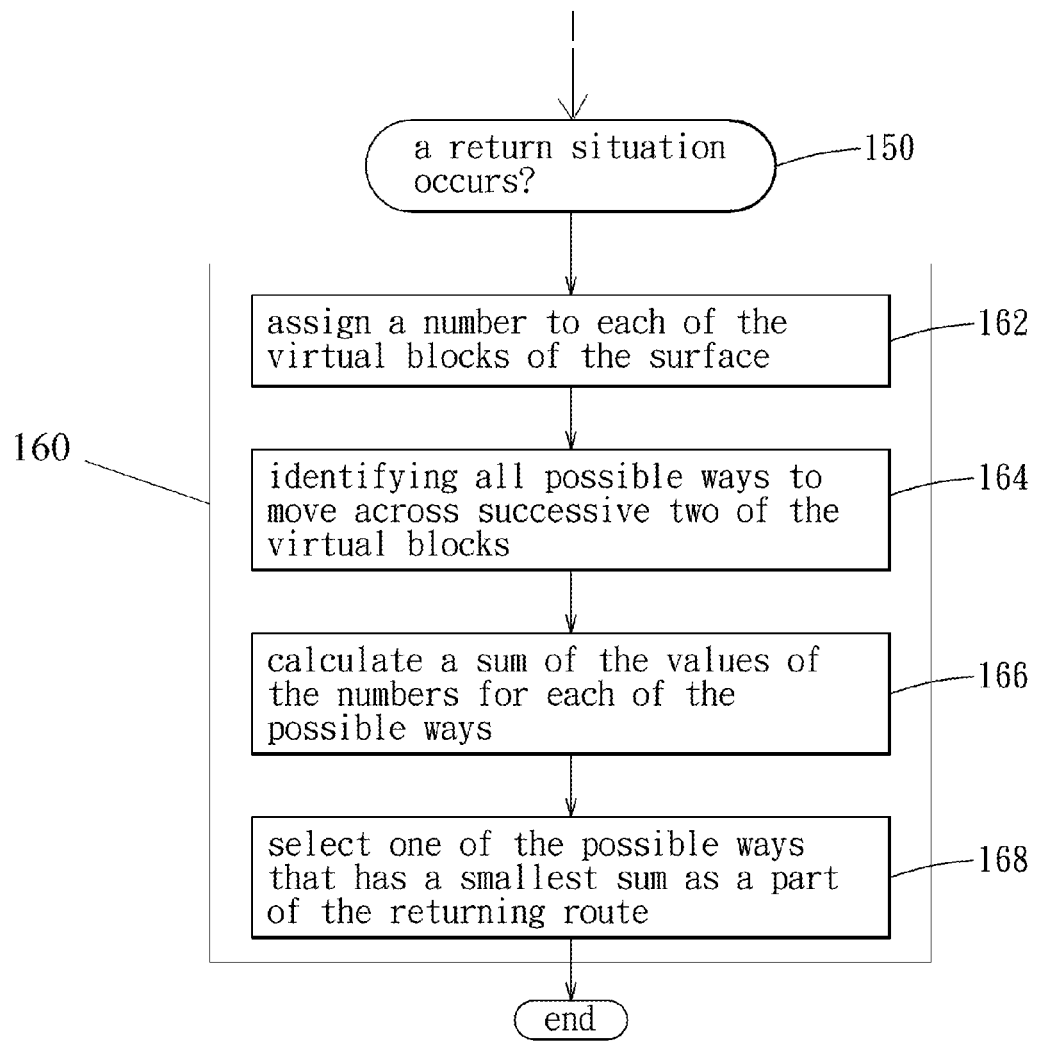
FIG. 12 a flow chart illustrating the returning route being plotted by the autonomous mobile device.

FIG. 12 illustrates the plotting of the returning route. In sub-step 162, the control unit 52 assigns a number to each of the virtual blocks 91 of the surface 9. Subsequently, the route plotting unit 58 plots the returning route by first identifying all possible ways to move the autonomous mobile device 1 across successive two of the virtual blocks 91 in sub-step 164. The route plotting unit 58 then calculates, for each of the possible ways, a sum of the values of the numbers that are assigned to the successive two of the virtual blocks 91 in sub-step 166, and selects one of the possible ways that has a smallest sum as a part of the returning route in sub-step 168, such that the control unit 52 is able to control the movement control module 3 to move the autonomous mobile device 1 along the returning route back to the base station 8.

To sum up, embodiments of this invention configure the processor 5 to record locations of the base station 8, the surrounding wall and the obstacles on the surface 9. As a result, when the autonomous mobile device 1 needs to be returned, the route plotting unit 58 is operable to plot a returning route that is relatively efficient for the autonomous mobile device 1 to return to the base station 8.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An autonomous mobile device configured to move on a surface provided with a base station thereon, said autonomous mobile device comprising:
   a housing;
   a motion control module disposed at said housing for controlling movement of said autonomous mobile device;
   a detecting module disposed at said housing for detecting presence of an obstacle near said housing; and
   a processor coupled to said motion control module and said detecting module, and configured to operate said autonomous mobile device in one of a work state and a return state;

wherein, in the work state, said processor is configured to plot a movement route on the surface and to control said motion control module to move said autonomous mobile device along the movement route on the surface, and is operable to adjust the movement route upon presence of an obstacle detected by said detecting module;

wherein, in the return state, said processor is configured to
partition a portion of the surface, over which said autonomous mobile device moves in the work state, into a plurality of virtual blocks with reference to a first axis and a second axis perpendicular to the first axis, determine a starting one of the virtual blocks where said autonomous mobile device currently locates, a destination one of the virtual blocks where the base station locates, and an exclusion one of the virtual blocks where the obstacle locates, assign a number to each of the virtual blocks of the surface, a value of the number assigned to one of the virtual blocks is monotonically related to a block distance between said one of the virtual blocks and the destination one of the virtual blocks, the values of the numbers assigned respectively to the virtual blocks being proportional to the block distances, using the virtual blocks except the exclusion one, plot a returning route on the surface from the starting one to the destination one of the virtual blocks by identifying all possible ways to move said autonomous mobile device across successive two of the virtual blocks, calculating, for each of the possible ways, a sum of the values of the numbers that are assigned to the successive two of the virtual blocks, and selecting one of the possible ways that has a smallest sum as a part of the returning route, when more than one of the possible ways have the smallest sum, said processor is operable to select one of the possible ways that has the smallest sum and that is along one of the first and second axes toward the base station as the part of the returning route, control said movement control module to move said autonomous mobile device, along the selected one of the possible ways, to a first one of the successive two of the virtual blocks, and control said motion control module to move said autonomous mobile device along the returning route to the base station.

2. The autonomous mobile device of claim 1, wherein:
said detecting module includes a front collision sensor disposed at a front position on said housing where said front collision sensor always faces forward when said autonomous mobile device moves straight, and a pair of side collision detectors each disposed on a respective side of said housing with respect to the front position, said front collision detector and said side collision detectors being capable of detecting objects that come near said autonomous mobile device;

when said autonomous mobile device moves straight and said front collision sensor first detects a surrounding wall, which surrounds the surface, at an initial position, said processor operates said autonomous mobile device in the work state with a contouring mode, in which said processor controls said movement control module to move said autonomous mobile device around the surrounding wall until said autonomous mobile device is returned to the initial position; and after said autonomous mobile device returns to the initial position in the contouring mode, said processor is operable to switch from the contouring mode to a ransacking mode, in which said processor controls said movement control module to move said autonomous mobile device in a forward direction, to rotate said autonomous mobile device to face a transverse direction, to move said autonomous mobile device in the transverse direction by a transverse distance, to rotate said autonomous mobile device to face an inverse direction opposite to the forward direction, and to move said autonomous mobile device in the inverse direction.

3. The autonomous mobile device of claim 2, wherein:
said detecting module is further for continuously detecting a current position of said autonomous mobile device on the surface, for detecting an angle, at which said autonomous mobile device rotates when said autonomous mobile device rotates, and for outputting to said processor the current position and the angle thus detected; and in the contouring mode, said processor is operable to
record, respectively as a rotating position and a rotation angle, the current position and the angle received from said detecting module whenever said autonomous mobile device rotates by an angle greater than a predetermined value, record, as an interval position, the current position of said autonomous mobile device received from said detecting module every time after said autonomous mobile device moves a predetermined distance, and derive a fitting equation expressing the interval positions between successive two of the rotating positions based on said interval positions.

4. The autonomous mobile device of claim 3, wherein, in the ransacking mode, said processor is operable to:
when said detecting module detects an obstacle, determine whether a present position of said autonomous mobile device can be expressed by the fitting equation;

when it is determined that the present position can be expressed by the fitting equation, control said movement control module to rotate said autonomous mobile device to face the transverse direction, to move said autonomous mobile device in the transverse direction by the transverse distance, to rotate said autonomous mobile device to face the inverse direction, and to move said autonomous mobile device in the inverse direction.

5. The autonomous mobile device of claim 4, wherein, when it is determined that the present position cannot be expressed by the fitting equation, said processor operates said autonomous mobile device in the contouring mode and controls said movement control module to move said autonomous mobile device around the obstacle until said autonomous mobile device returns to the present position.

6. The autonomous mobile device of claim 1, wherein said processor operates said autonomous mobile device in the return state when said autonomous mobile device has travelled thoroughly over the surface, when said processor detects that an amount of electrical power stored in said power storage unit is less than a threshold, or when said autonomous mobile device receives an external return signal.

7. The autonomous mobile device of claim 1, wherein said detecting module includes a front collision detector, an altitude detector, and an accelerometer,
wherein said processor is operable to control said autonomous mobile device to move backward by a safety distance and to rotate at a safety angle before moving said autonomous mobile device again when said front collision detector detects a nearby obstacle, when said altitude detector detects a vertical distance between a bottom side of said housing and the surface greater than a predetermined safe height, or when said accelerometer detects an inclination steeper than a predetermined safe inclination.

8. An operating method of an autonomous mobile device configured to move on a surface provided with a base station thereon, the autonomous mobile device including a motion control module for controlling movement of the autonomous mobile device, a detecting module for detecting presence of an obstacle, and a processor coupled to the motion control module and the detecting module, said operating method comprising the following steps of:
(a) operating, by the processor, the autonomous mobile device in a work state with the following sub-steps of
plotting a movement route on the surface,
controlling the motion control module to move the autonomous mobile device along the movement route on the surface, and
adjusting the movement route upon presence of an obstacle detected by the detecting module; and
(b) operating, by the processor, the autonomous mobile device in a return state with the following sub-steps of
partitioning a portion of the surface, over which the autonomous mobile device moves in the work state, into a plurality of virtual blocks with reference to a first axis and a second axis perpendicular to the first axis,
determining a starting one of the virtual blocks where the autonomous mobile device currently locates, a destination one of the virtual blocks where the base station locates, and an exclusion one of the virtual blocks where the obstacle locates,
assigning a number to each of the virtual blocks of the surface, a value of the number assigned to one of the virtual blocks is monotonically related to a block distance between the one of the virtual blocks and the destination one of the virtual blocks, the values of the numbers assigned respectively to the virtual blocks being proportional to the block distances,
using the virtual blocks except the exclusion one to plot a returning route on the surface from the starting one to the destination one of the virtual blocks by identifying all possible ways to move the autonomous mobile device across successive two of the virtual blocks, calculating, for each of the possible ways, a sum of the values of the numbers that are assigned to the successive two of the virtual blocks, and selecting one of the possible ways that has a smallest sum as a part of the returning route,
when more than one of the possible ways have the smallest sum, selecting one of the possible ways that has the smallest sum and that is along one of the first and second axes toward the base station as the part of the returning route,
controlling the movement control module to move the autonomous mobile device, along the selected one of the possible ways, to a first one of the successive two of the virtual blocks, and
controlling the motion control module to move the autonomous mobile device along the returning route to the base station.

9. The operating method of claim 8, the detecting module including a front collision sensor disposed at a front position on the housing, and a pair of side collision detectors each disposed on a respective side of the housing with respect to the front position, the front collision detector and the side collision detectors being capable of detecting objects that come near said autonomous mobile device, the front collision sensor always facing forward when the autonomous mobile device moves straight, wherein in step (a):
when the autonomous mobile device moves and the front collision sensor first detects a surrounding wall that surrounds the surface, at an initial position, the processor operates the autonomous mobile device in the work state with a contouring mode, in which the processor control the movement control module to move the autonomous mobile device around the surrounding wall until the autonomous mobile device is returned to the initial position; and
after the autonomous mobile device returns to the initial position in the contouring mode, the processor switches from the contouring mode to a ransacking mode, in which the processor controls the movement control module to
move the autonomous mobile device in a forward direction,
rotate the autonomous mobile device to face a transverse direction,
move the autonomous mobile device in the transverse direction by a transverse distance,
rotate the autonomous mobile device to face an inverse direction opposite to the forward direction, and
move autonomous mobile device in the inverse direction.

10. The operating method of claim 9, wherein the detecting module of the autonomous mobile device continuously detects a current position of the autonomous mobile device on the surface, and detects an angle, at which the autonomous mobile device rotates when the autonomous mobile device rotates, and in step (a), when in the contouring mode, the processor executes the following operations:
recording, respectively as a rotating position and a rotation angle, the current position and the angle received from the detecting module whenever the autonomous mobile device rotates by an angle greater than a predetermined value,
recording, as an interval position, the current position of the autonomous mobile device received from the detecting module every time after the autonomous mobile device moves a predetermined distance, and
deriving a fitting equation expressing the interval positions between successive two of the rotating positions based on the interval positions.

11. The operating method of claim 10, wherein in step (a), when in the ransacking mode, the processor executes the following operations:
upon detection of an obstacle, determining whether a present position of the autonomous mobile device can be expressed by the fitting equation; and
when it is determined that the present position can be expressed by the fitting equation, controlling the movement control module to
rotate the autonomous mobile device to face the transverse direction, moving the autonomous mobile device in the transverse direction by the transverse distance, rotating the autonomous mobile device to face the inverse direction, and moving the autonomous mobile device in the inverse direction.

12. The operating method of claim 11, wherein when it is determined that the present position cannot be expressed by the fitting equation, the processor operates the autonomous mobile device in the contouring mode and controls the movement control module to move the autonomous mobile device around the obstacle until the autonomous mobile device returns to the present position.

13. The operating method of claim 8, the autonomous mobile further including a power storage unit that is coupled to the processor, wherein, the processor operates the autonomous mobile device in the return state when one of the following occurs:
- the autonomous mobile device has travelled thoroughly over the surface;
- detection, by the processor, that an amount of electrical power stored in the power storage unit is less than a threshold; and
- receipt of an external return signal.

14. The operating method of claim 8, the detecting module of the autonomous mobile device including a front collision detector, an altitude detector, and an accelerometer, wherein said operation method further comprising controlling, by the processor, the autonomous mobile device to move backward by a safety distance and to rotate at a safety angle before moving the autonomous mobile device again when the front collision detector detects a nearby obstacle, when the altitude detector detects a vertical distance between a bottom side of said housing and the surface greater than a predetermined safe height, or when the accelerometer detects an inclination steeper than a predetermined safe inclination.

* * * * *